A. B. LAKEY & E. E. ROSS.
TRANSMISSION APPARATUS.
APPLICATION FILED MAY 20, 1909. RENEWED JUNE 15, 1915.

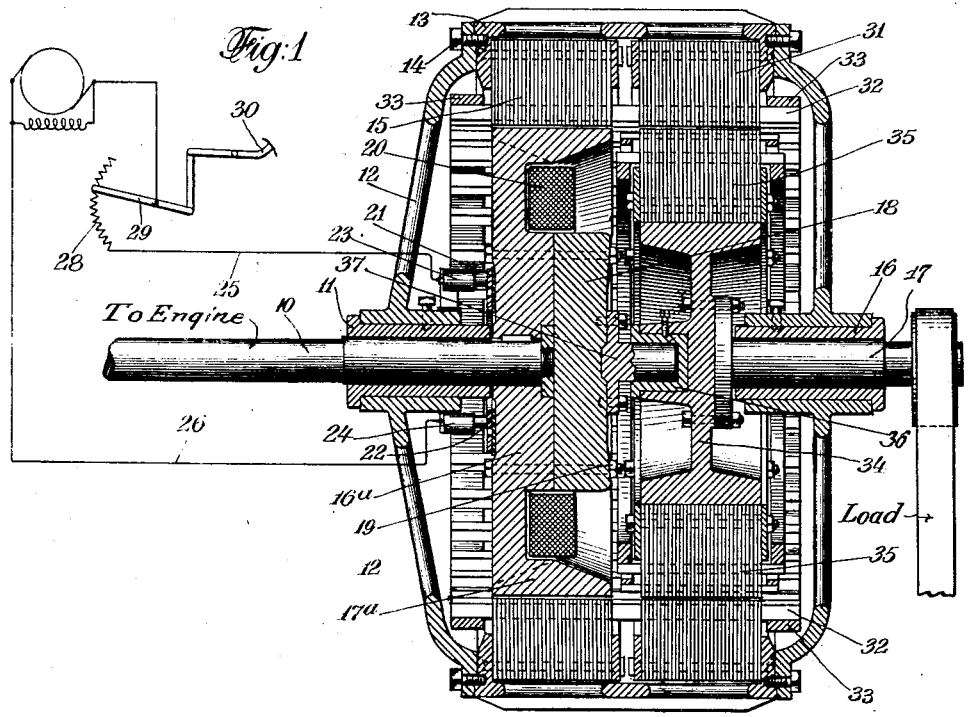//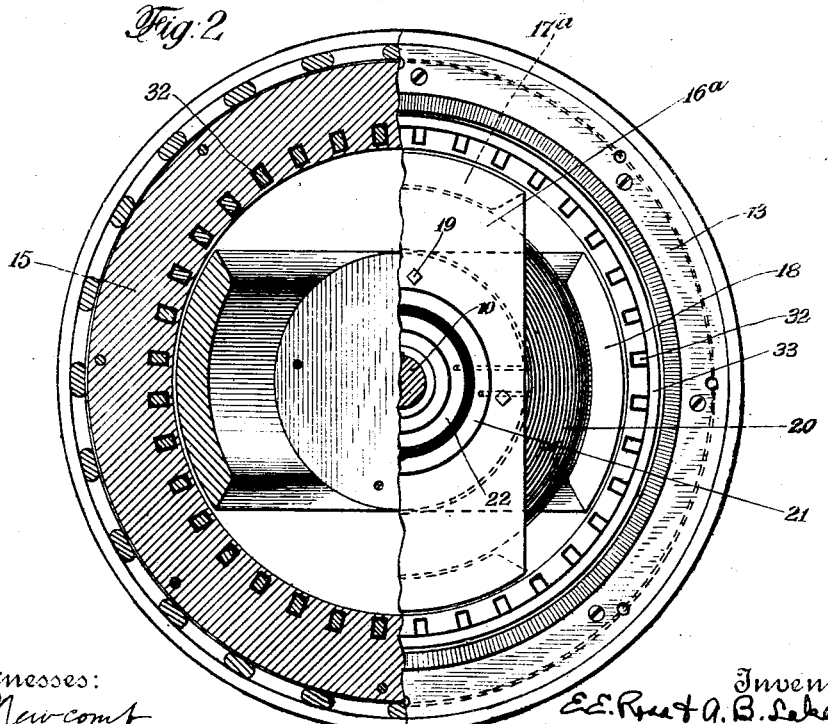

1,158,243.

Patented Oct. 26, 1915.
2 SHEETS—SHEET 2.

Witnesses:
A. Newcomb
G. B. Prindle.

Inventors
E. E. Ross & A. B. Lakey,
By their Attorneys
Prindle and Wright.

UNITED STATES PATENT OFFICE.

ARTHUR B. LAKEY, OF SOUTH BETHLEHEM, AND EDWARD E. ROSS, OF PHILADELPHIA, PENNSYLVANIA.

TRANSMISSION APPARATUS.

1,158,243.   Specification of Letters Patent.   Patented Oct. 26, 1915.

Application filed May 20, 1909, Serial No. 497,238. Renewed June 15, 1915. Serial No. 34,316.

*To all whom it may concern:*

Be it known that we, ARTHUR B. LAKEY, of South Bethlehem, in the county of Northampton, and in the State of Pennsylvania, and EDWARD E. Ross, of Philadelphia, Pennsylvania, have invented a certain new and useful Improvement in Transmission Apparatus, and do hereby declare that the following is a full, clear, and exact description thereof.

The object of our invention has been to provide an apparatus by which, without mechanical connection, power can be transmitted from a prime mover to a driven shaft, either at the same or a different speed.

A further object of our invention is to provide such an apparatus by which a variable torque and speed may be transmitted to a driven shaft from a power shaft driven at substantially constant speed.

A further object of our invention is to provide such an apparatus which shall be capable of giving a constant speed to a driven shaft from a prime mover when there are variations in the load of the driven shaft.

More particularly, it is the object of our invention to provide an electric transmission apparatus, by which power from a prime mover of substantially constant speed, such as a gasolene engine, may be transmitted to a shaft having widely different degrees of speed and power, such as the driving shaft of an automobile; and to such ends our invention consists in the transmission apparatus hereinafter specified.

Figure 3:
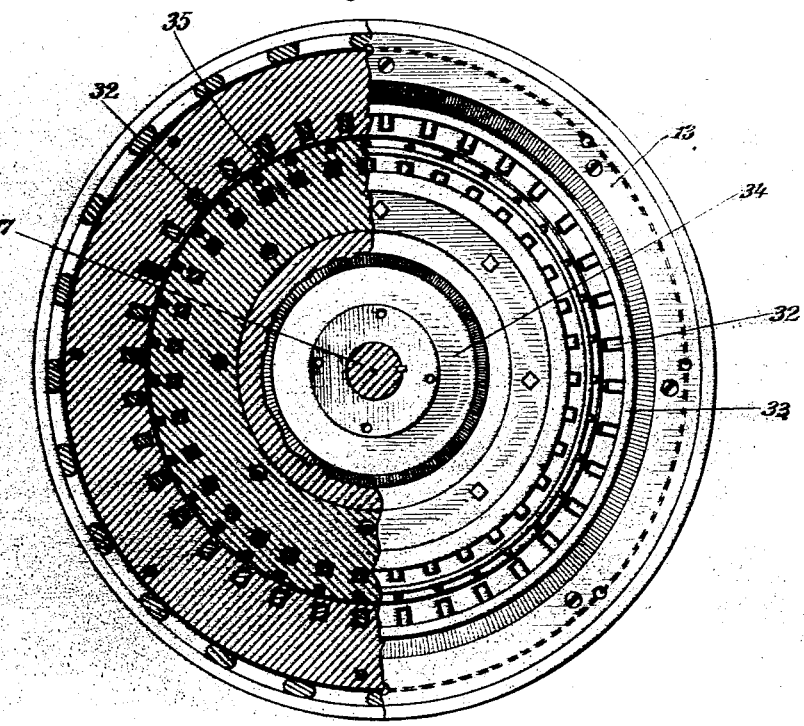
Figure 4:
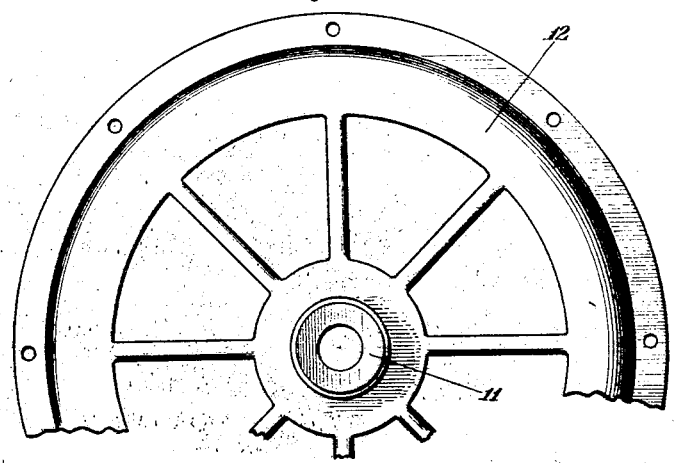

In the accompanying drawings Figure 1 is a sectional view of the plan of the parts of an apparatus embodying our invention; Fig. 2 is a view of the generator end of the apparatus, the left hand portion of the view being a mid-section, and the right hand portion of the view being an end view with the cover and brushes removed; and Fig. 3 is a view of the motor end of the apparatus, the left hand portion of the view being shown in section, and the right hand section having the cover removed. Fig. 4 is a view of the cover used on the generator end of the apparatus.

There are many instances in which variable torque and speed are required to be given to a driven shaft when the power is supplied by a substantially constant power at a constant speed. A typical instance is an automobile driven by a gasolene engine. Such engines are not suited to service which requires a wide range of torque and speed. They must operate within narrow limits of speed in order to secure anything like good efficiency from them, and in fact will stop and will not operate at all below a certain speed. While the gasolene engine must run at a substantially uniform speed, it is evident the automobile must be capable of running at widely different speeds, and that when starting an automobile, large torque at a slow speed is desirable, while in running, a moderate torque at a high speed is desirable. In other words, what is termed "inverse speed-torque" characteristics are required of the driven shaft of an automobile, while the gasolene engine operates to advantage only at a constant speed and torque. The usual method of meeting these requirements is by means of change speed gearing. This is objectionable because of the great wear and tear upon the gears and the difficulty of manipulating them. The apparatus herein described provides an efficient and very satisfactory method for accomplishing the desired results.

Our invention is capable of embodiment in many different forms, and the apparatus herein described is to be taken only as an embodiment typifying in the most general sense our invention. It is only one of many possible embodiments thereof.

In such apparatus, the driving shaft 10 of the engine is mounted in a bearing 11 in a casing 12 containing the principal parts of our apparatus. The said casing consists of end circular plates or spiders secured to a cylindrical body 13 by bolts 14. Within the said body and secured between annular side plates are annular laminations 15 to be later referred to. A bearing 16 is formed in the spider opposite the bearing 11, and a driven shaft 17 is mounted in said latter bearing. The driving shaft drives what we shall term a "generator", and the driven shaft is driven by what we shall term a "motor". The said generator consists of a field of the "claw" type. This field consists of a substantially rectangular plate 16ª fastened on the driving shaft and having rounded ends, the said plate having pole pieces 17ª projecting toward the driven shaft. A similar plate 18 is secured at right angles to the plate 16ª as by bolts 19 passing through the said plates, and the poles of the plate 18 project toward the driving shaft, and at points circumferentially intermediate between the poles of the plate 18. The plates 16ª and 16ᵇ are provided with annular channels which receive between them a coil 20 which is adapted to energize the field in the well known manner. The ends of the said coil are attached to slip rings 21 and 22, respectively, which are secured to the side of the plate and said rings are engaged by brushes 23 and 24 respectively, said brushes being mounted in brush holders on the frame. Said brushes are connected by leads 25 and 26 respectively with the brushes of a direct current magneto, or ignition dynamo which may also serve as the ignition magneto of the explosive engine. A rheostat 28 is interposed in the lead 25 and is engaged by a contact lever 29. The contact lever 29 may be controlled by a pedal 30 connected by a link with the lever. The laminations 15 form an armature to the rotating field consisting of the plates 16ª and 18 and the coil 20. A second set of laminations 31, which may be substantially the same as the set of laminations 15, is also mounted in the casing, which second set forms the armature of the motor hereinafter described. A series of copper bars 32, preferably straight and preferably parallel to the axes of the shafts, is embedded in the laminations, and each bar extends through both sets of laminations. At their outer ends, each of the bars is in contact with a short-circuiting ring 33. The system of bars and rings is completely electrically insulated.

On the driven shaft is mounted a cylindrical rotor body 34 to which is fastened a series of annular laminations 35. The laminations 35 preferably have two sets of copper bars mounted therein, which bars are parallel to the axis, and each set has a short-circuiting ring at each end of its bars. The outer set is preferably of higher resistance and smaller inductance than the inner set, and the smaller inductance is preferably obtained by mounting said outer set in open slots so as not to be completely inclosed in the iron of the laminations, while the inner set is completely surrounded by the iron. Both sets are completely insulated electrically. The body or spider 34 preferably carries a bearing 36 which engages a stud 37 fastened to the plate 18, whereby the two shafts are better maintained in alinement. The driven shaft 17 is connected with the wheels directly when the automobile is going ahead, and through a reverse gearing when the automobile is going backward.

In the operation of the illustrated embodiment of our invention, when the automobile is starting from rest, the pedal is moved to a position in which no current passes from the magneto through the field coil 20, and thus the apparatus is prevented from transmitting any power, and the explosive engine is free to run without load. The engine is then started, and after it has attained full speed, the pedal is moved to cut out the resistance and admit the current of the magneto to the coil 20 of the generator. The field coil sets up a magnetic field in the core, consisting of the plates 16ª and 18. The pole pieces of the said core rotate inside the laminated ring 15 of the stationary armature, and the lines of flux of the field enter the ring from two diametrically opposed pole pieces, traversing the ring in each direction to the two remaining pole pieces, thus completing the magnetic circuit. In this manner a "rotating field" is created, moving around in the set of laminations 15. This field cuts the copper bar inductors embedded in the laminations, setting up electro-motive forces in them, which forces depend in strength and direction on the portion of the rotating field which is passing the respective bars at the time. The series of inductor bars, being connected at each end electrically by the short circuiting rings, permits the said electro-motive forces to set up currents in the bars by providing return paths through other bars of the series.

The route of the current in this system is like that in the ordinary short-circuited "squirrel cage" induction motor rotor. Thus in each particular bar there is an alternating current flowing, which is produced by the motion of the field of the generator, and which passes through the other laminated armature ring consisting of the set 31 of annular laminations. The effect of the rotating field in the generator armature 15 is thus to set up a certain current in each of the bars, which bars carry the same current through the field of the motor, consisting of the set of annular laminations 31; thus producing another rotating field in the motor armature, which field moves at the same speed as that in the generator armature, and therefore at the same speed as the engine. The currents in the inductor bars are always reduced in value, while the machine is doing work, by the "counter electromotive force" of the motor end which is set up in the portions of the bars passing through the set of laminations 31. The rotating field of magnetism thus produced in the motor laminations causes the rotation of the armature of the motor. The motor end of the apparatus is practically nothing more than an induction motor, the only difference being that the rotating field is produced in the stator member by the action of the short-circuited windings or inductor bars which receive energy directly in the generator armature instead of by phase-wound stator windings, which receive their energy from alternating current transmission lines as is usually the case in induction motors.

Since one of the desiderata of this apparatus is to have a large torque exerted by the rotor at starting and at low speeds, we may employ any of the recognized methods for producing this result. All of these methods have as their object the offering of opposition or "impedance" to an excessive flow of the current at starting, when otherwise it would rise to very large values and by its reaction on the rotating field make the starting torque very small. As the speed increases, the opposition is reduced. The terms "rotor, impedance," etc., are here to be understood in their broadest sense, and applicable to any type of electrical motor.

In the illustrated embodiment of our invention, this regulation is obtained by the inductive effects in the armature. At low speeds the frequency is high, and the inductance of the large, or inner, conductors prevents much current from flowing through them. As the motor speeds up, the frequency reduces and the large bars begin to take more current, and then the motor is acting as though it had a rotor wound with low resistance. As the speed increases, the flux from the field laminations 31 penetrates deeper into the rotor laminations 35, and the inner or larger system of inductors or squirrel cages is cut, and on account of the heavy cross-section of this larger squirrel cage, greater facilities for the passage of the current are offered. Thus in fact at starting great opposition is offered to the passage of the current in the squirrel cages, while as the speed increases, the opposition is in fact reduced.

In order to accelerate the automobile to full speed as quickly as possible, it is desirable that full power of the engine shall be transmitted through the apparatus to a driven shaft. Since, therefore, the power of the driven end is to be constant (that is, equal to that of the engine), while the speed varies from a small value up to that of the engine (nearly), the torque must start at a large value and decrease to that of the engine when the latter is at full speed. Our apparatus, as we have described it, accomplishes this. When, however, the full power of the engine is not needed, as when the automobile is threading its way through a crowded thoroughfare, the power of the engine may be reduced by throttling, etc., which will either reduce the speed of the engine or the torque or both. Which of these two quantities will be varied depends on the manner of regulating the field of the generator. Strengthening the field by cutting out resistance will reduce the speed of the engine and tend to maintain the torque, while weakening the field will reduce the torque while tending to maintain the speed of the engine. If the constant-power characteristics of the generator and motor could be fully realized, the machine would be entirely automatic for full power running, that is, with the engine speed and torque constant. The attaining of these characteristics, of course, depends largely upon empirical considerations; but even if they cannot be entirely realized, the results can be attained by adjustment of the field currents, the rotor current or the armature current.

When the automobile is running down hill, our apparatus can be used as a brake. By running the driving engine slowly, the braking effect well known in induction motors can be secured.

The use of short-circuited armature windings is very important in making the apparatus of small weight for a given power, and for two reasons: (1) There is a large reduction of the weight and space which the end connections of coils would necessitate; and (2) it allows the machine to be easily constructed as a multi-phase machine (because the number of phases is increased by simply increasing the number of bars beneath a pole, the number of phases being equal to the number of bars under a pole), and hence increases its rating for a given size.

It is obvious that many changes can be effected in the above-illustrated embodiment of our invention without departure from the spirit of our invention; for instance, while we have illustrated an alternating current generator and an induction motor, a direct current generator and a series motor could be used, and any or all of the sets of windings may be phase wound.

We claim:

1. In a transmission apparatus, the combination of a driving shaft, an alternating current rotor mounted thereon, a driven shaft, a squirrel cage armature mounted thereon, and stators for said parts having armature conductors, each of which passes through the cores of both stators.

2. In a transmission apparatus, the combination of a driving shaft, an alternating current generator connected therewith, a driven shaft, and an induction motor connected with said driven shaft, the armature conductors of the generator being continuous with the primary conductors of the motor.

3. In a transmission apparatus, the combination of a driving shaft, an alternating current generator connected therewith, a driven shaft, an induction motor connected with said driven shaft, the armature conductors of the generator being continuous with the primary conductors of the motor, and means for increasing the impedance of the rotor windings of the motor when required.

4. In a transmission apparatus, the combination of a prime mover, a load to be driven, and electro-magnetic connecting mechanism consisting of a generator and a motor having separate stator cores, the stator windings of the two being continuous with each other.

5. In a transmission apparatus, the combination of a prime mover, a part to be driven, and a pair of electro-magnetic means, respectively connected to said prime mover and part, the stator windings of which means constitute a single series of short-circuited conductors or squirrel cages.

6. In a transmission apparatus, the combination of a driving shaft, an alternating current generator connected therewith, a driven shaft, an induction motor connected with said driven shaft, the armature conductors of the generator being continuous with the primary conductors of the motor, and means provided for adjusting the value of the current in the windings of the rotor.

7. In a transmission apparatus, the combination of a driving shaft, an alternating current generator connected therewith, a driven shaft, an induction motor connected with said driven shaft, the armature conductors of the generator being continuous with the primary conductors of the motor, and means provided for adjusting the value of the current in both armature windings and in the rotor windings.

8. In a transmission apparatus, the combination of a motor and a generator, each having a separate core and a winding, one of said latter parts being common both to the motor and the generator.

9. In a transmission apparatus, the combination of a motor and a generator each having a separate core and a winding, one of said latter parts in each of said two machines being continuous with a similar part of the other of said machines.

10. In a transmission apparatus, the combination of a driving shaft, an alternating current generator connected therewith, a driven shaft, an induction motor connected with said driven shaft, the armature conductors of the generator being continuous with the primary conductors of the motor, and means provided for adjusting the value of the current in these windings.

11. In an electro-magnetic transmission mechanism, the combination of an alternating current generator having a squirrel cage armature winding, an alternating current motor having a squirrel cage primary winding, the inductors of said windings being continuous with each other, and a squirrel cage secondary winding for said motor.

In testimony that we claim the foregoing we have hereunto set our hands.

ARTHUR B. LAKEY.

Witnesses:
  H. L. BACHMAN,
  WM. R. BACHMAN.

EDWARD E. ROSS.

Witnesses:
  FRED. C. STOLL,
  CHARLES L. HINTZ.